United States Patent [19]
Toscan

[11] 3,862,398
[45] Jan. 21, 1975

[54] SAILBOAT RACING CALCULATOR

[76] Inventor: Richard E. Toscan, 26410 Birchfield Ave., Palos Verdes Peninsula, Calif. 90274

[22] Filed: Mar. 14, 1974

[21] Appl. No.: 451,067

[52] U.S. Cl. ................. 235/61 NV, 235/78, 235/88
[51] Int. Cl. ........................ G06c 27/00, G06g 1/08
[58] Field of Search ............. 235/61 NV, 78, 88, 83, 235/61 GM

[56] References Cited
UNITED STATES PATENTS

| | | | |
|---|---|---|---|
| 3,027,073 | 3/1962 | Handelman | 235/83 |
| 3,497,681 | 2/1970 | Warner | 235/61 NV |
| 3,609,299 | 9/1971 | Wright | 235/61 NV |
| 3,625,417 | 12/1971 | Slauter | 235/61 NV |

*Primary Examiner*—Stephen J. Tomsky
*Attorney, Agent, or Firm*—Fulwider, Patton, Rieber, Lee & Utecht

[57] ABSTRACT

A sailboat racing calculator which is used on a sailboat in conjunction with a compass and a boat speed indicator. A compass dial marked with compass bearings is coaxially rotatably supported below a reference plate having a window for viewing the compass markings on the compass dial. A boat speed arm is pivotally mounted relative to the compass dial and reference plate. The compass dial and the boat speed arm are rotatable relative to one another and the reference plate. A speed read-out arm is mounted to slide perpendicularly to the vertical axis of the compass dial, reference plate, and boat speed arm to permit the sailor to utilize his compass readings and boat speed readings to determine optimum compass headings for sailing each leg of a racing course in the fastest time possible.

6 Claims, 4 Drawing Figures

SAILBOAT RACING CALCULATOR

BACKGROUND OF THE INVENTION

1. Field of the Invention

The present invention relates generally to sailboats and more particularly to a novel sailboat racing calculator for use with a compass and a boat speed indicator.

2. Description of the Prior Art

Applicant is not aware of any simple racing calculators useable with a sailboat compass and boat speed indicator providing the sailor with the optimum compass headings for sailing each leg of a racing course in the fastest time possible.

SUMMARY OF THE INVENTION

The racing calculator of the present invention is adapted to be used in conjunction with the compass and speed indicator of a sailboat. The racing calculator includes a compass dial provided with compass bearing markings which are coaxially rotatable realtive to a reference plate. The reference plate is provided with a window through which the indicia on the compass dial may be seen. A boat speed arm is pivotally supported on the axis of rotation of the compass dial. A speed read-out arm is mounted to slide perpendicularly to the vertical axis of the compass dial, reference plate, and boat speed arm. By properly manipulating the compass dial, boat speed and speed read-out arms, the racing sailor is able to utilize his compass and boat speed indicator to determine optimum compass headings for sailing each leg of a racing course in the fastest time possible. The racing calculator of the present invention is of simple, rugged construction whereby it may be used in the cockpit of a sailboat. Additionally, it will provide a long and useful service life.

DESCRIPTION OF THE PREFERRED EMBODIMENT

Figure 1:
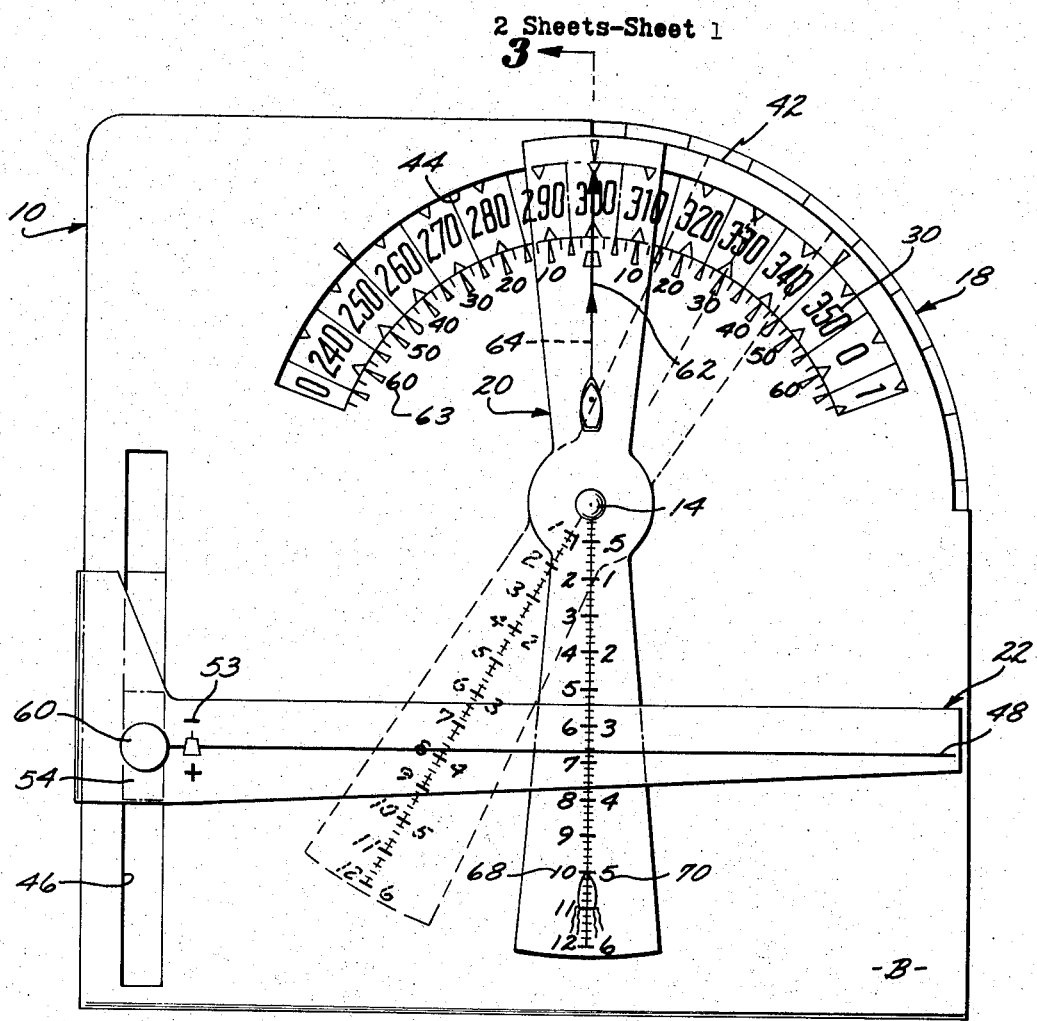
FIG. 1 is a top plan view of a preferred form of sailboat racing calculator embodying the present invention.

A preferred form of sailboat racing calculator embodying the present invention includes body B that is folded along its bottom to define a reference plate, generally designated 10, disposed over a backing plate, generally designated 12, between which is horizontally coaxially supported a compass dial, generally designated 18, said dial being rotatably affixed to the plates by a rivet 14. The rivet 14 also pivotally supports a boat speed arm, generally designated 20. The boat speed arm is positioned above the reference plate 10. The compass dial 18 and boat speed arm 20 are rotatable relative to one another and to the reference plate 10 and the backing plate 12. A horizontally extending speed read-out arm, generally designated 22, is mounted on the reference plate 10 and slides perpendicularly to the vertical axis of the reference plate 10 and boat speed arm 20. The speed read-out arm 22 is positioned above the reference plate 10 and the boat speed arm 20 and rides upon the latter.

More particularly, reference plate 10 and backing plate 12 are formed near their midportions with aligned apertures 24 and 26 which receive rivet 14. Rivet 14 therefore secures plates 10 and 12 together, as well as serving as a pivotal mounting for boat speed arm 12 and compass dial 18. The compass dial 18 is provided on its upper surface with a circumferential row of numerical indicia 30, corresponding to the degree markings of a compass. Reference plate 10 has an arced peripheral notch 42 to facilitate rotating the compass dial 18, and is formed at its upper portion with an elongated, annular bearing window 44. Reference plate 10 is formed at one side with a vertically extending rectangular aperture 46 of such length as to permit a guideline 48 printed on the speed read-out arm 22 to traverse scales 68 and 70 printed on the lower portion of the boat speed arm 20. This rectangular aperture 46 accepts a slider 54 of slightly smaller width attached to the underside of the speed read-out arm 22 in such a manner as to maintain the guideline 48 perpendicular to the vertical axis of the reference plate 10 and compass dial 18.

Figure 2:
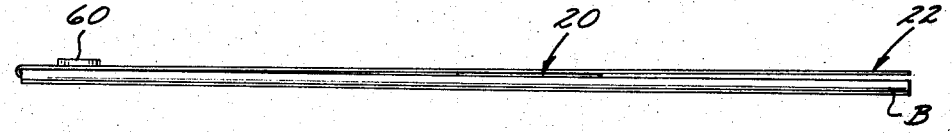
FIG. 2 is a side elevational view of said racing calculator.
Figure 3:
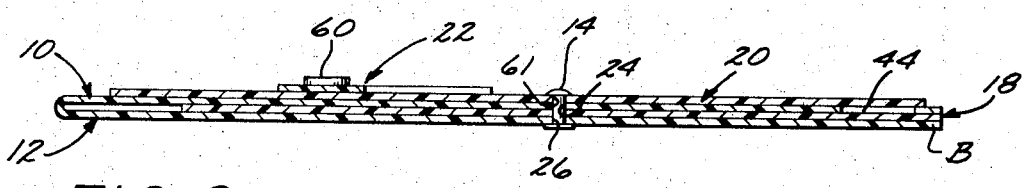
FIG. 3 is a vertical sectional view taken on line 3—3 of FIG. 1.

The speed read-out arm 22 is folded over downwardly upon itself at its left-hand side (FIGS. 1–3) so as to form a flap 56 (FIG. 4) which retains the slider 54 of the speed read-out arm 22 in the rectangular aperture 46 of the reference plate 10. The flap 56 lies beneath the reference plate 10 and above the backing plate 12. The upper surface of the speed read-out arm 22 at the center of the slider 54 has attached to it a pad 60 to facilitate operating the arm 22 with the thumb of one hand (not shown). The upper surface of the speed read-out arm 22 is provided with a "minus" mark 53 above and a "plus" mark below guideline 48.

Figure 4:
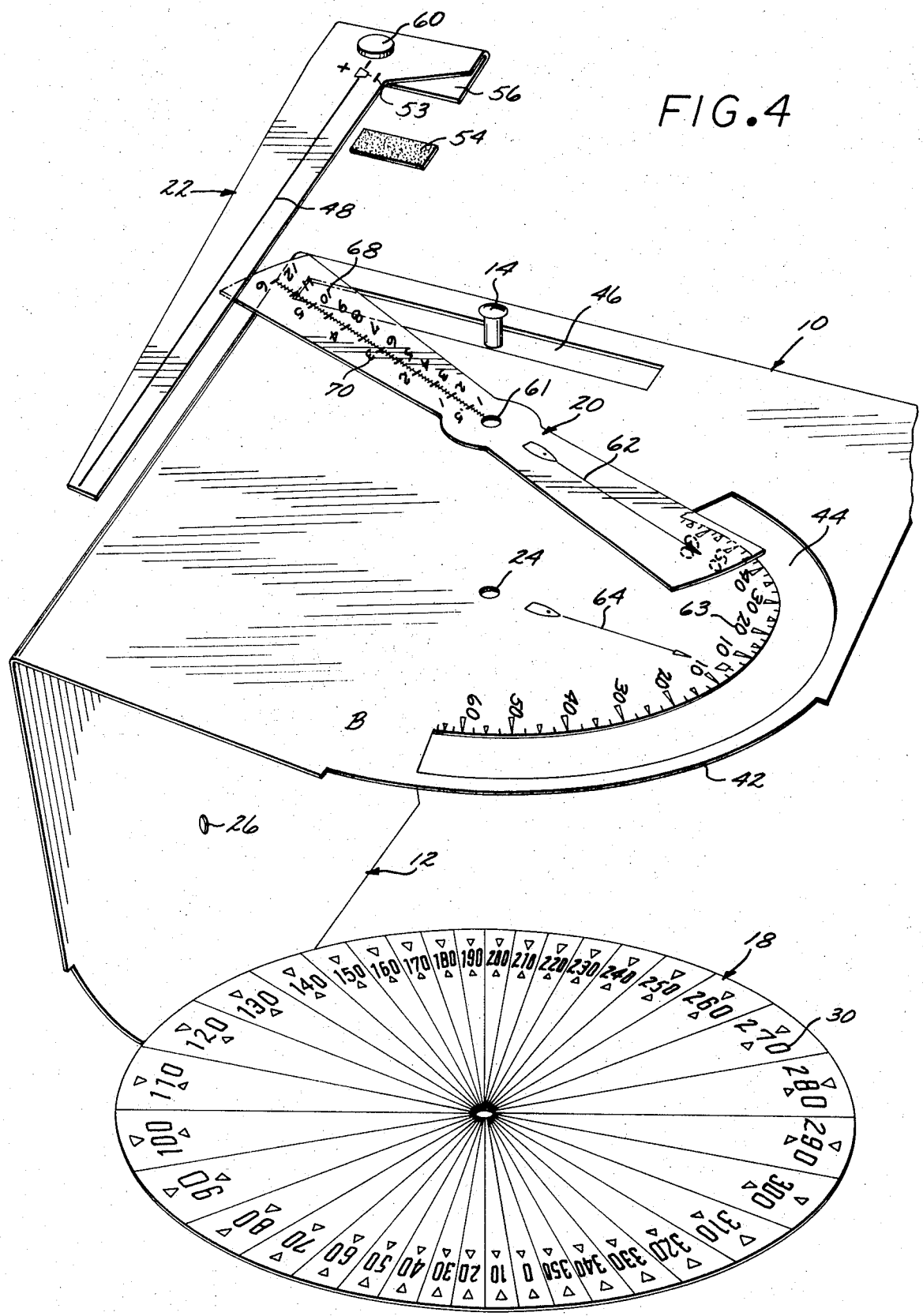
FIG. 4 is a vertically exploded perspective view of said racing calculator.

The boat speed arm 20 has upper and lower portions of generally trapezoidal configuration, with their outer edges being arcuate. At approximately its midpoint, arm 20 is formed with an aperture 61 which accepts the upper portion of rivet 14. The upper portion of this arm 20 terminates at the edge of the arced notch 42 and its lower portion terminates near the lower portion of the reference plate 10. A bearing arrow 62 imprinted on the upper portion of boat speed arm 20 extends radially outwardly from above rivet 14 to a point overlying the outer portion of window 44. The upper portion of reference plate 10 is marked with a circumferential row of numerical indicia 63 below bearing window 44. The midpoint of reference plate 10 is imprinted with a vertical boat heading arrow 64 extending radially from rivet 14 to adjacent the inner edge of window 44 (FIG. 4). The upper end of arrow 64 bisects the arc of bearing window 44. The lower portion of boat speed arm 20 is bisected by scales 68 and 70 radially extending downwardly from rivet 14. The indicia on scales 68 and 70 represent boat speed in knots or miles as determined by reading the speed indicator of the boat (not shown). Scale 68 is the high range, e.g., up to 12 knots or miles, while scale 70 is the low range, e.g., up to 6 knots or miles.

Preferably, backing plate 12, reference plate 10, and compass dial 18 will be formed of an opaque synthetic plastic material, while the boat speed arm 20 and speed read-out arm 22 will be formed of transparent synthetic plastic material. These plastic materials should be resistent to wear and to water exposure.

In utilizing the aforedescribed racing calculator, the compass dial 18 is adjusted to the compass bearing of a mark towards which the boat is headed. Thus, referring to FIG. 1, assume such compass bearing to be 300°. The compass dial 18 is shown arranged at this setting. Next, the boat speed arm 20 is pointed straight up whereby its arrow 64 intersects "300" on the compass dial 18, with arrow 64 overlying arrow 62. The boat's speed indicator is then checked for boat speed and the speed read-out arm 22 is vertically adjusted so that guideline 48 intersects the value of such boat speed on indicia row 68 or 70. In FIG. 1, it may be assumed the boat speed is 6.6 knots. Again, referring to FIG. 1, assume the boat is now borne off or headed up to a new course but towards the same mark for e.g., 330°. The boat speed arm 20 is then pivoted until its bearing arrow 62 points to such new course of 330 degrees with the speed read-out arm 22 remaining in its original position. With the boat speed arm and the speed read-out arms so positioned, the break-even speed required to provide the same boat speed towards the mark on the new course of 330°appears at the intersection of guideline 48 with the row of indicia 68, i.e., 7.6 knots. The actual boat speed is then determined by means of the boat speed indicator. If such actual boat speed lies above the guideline 48 on the indicia row 68, i.e., in the "minus" area of the speed read-out arm 22, the boat speed towards the mark is less than on the original heading of 300°. If, however, the actual boat speed lies below the guideline 48, i.e., in the "plus" area of the speed read-out arm 22, the boat speed towards the mark is greater than it was on the 300° course.

It should be noted that where the yachtsman wishes to try tacking downwind in order to see if the increased speed gained by this maneuver will offset the increased distance to a leeward mark, the boat is first headed directly for the mark and the compass dial 18 is then rotated so that the actual compass bearing to the mark will appear at the center of the bearing window 44. For the sake of example, and referring to FIG. 1, such bearing may be assumed to be "300°". As in the prior example, the guideline 48 of the speed read-out arm 22 is then moved over the lower portion of the boat speed arm 20 so that such guideline falls upon the corresponding speed indicia in either row 68 or row 70. Assuming such speed to be that shown in FIG. 1 in row 70, the guideline lies over 3.6 knots. The boat's heading is then altered 30° from the direct course of 300° to the mark, i.e., to 330°, as shown in FIG. 1. The boat speed arm 20 is then rotated so that its arrow 64 is aligned with 330° on the compass dial 18. With speed read-out arm 22 in its original position, the guideline 48 will indicate the actual boat speed required on a course of 330° to equal the actual boat speed obtained on the original course of 300°. If the actual boat speed falls above guideline 48 on indicia row 70, it is faster to sail directly for the mark, i.e., to remain on the 300° course. Conversely, if the actual boat speed falls below the guideline 48 in indicia row 70, it is faster to sail at a course of 300°. The aforedescribed operation may be repeated for any subsequent change in the boat's course relative to the direct course to the mark, eventuating in finding the optimum heading and speed combination for sailing a leg in the fastest time possible.

Reference should now be had to the indicia 63 printed below the lower edge of bearing window 44. Indicia 63 extend right and left from boat heading arrow 64 from 0° to 75°, such indicia corresponding to the number of degrees a boat compass heading has been altered from the direct course to the mark. Thus, if the optimum heading for the boat on the starboard jibe is 330°, the yachtsman can readily determine that when the boat is changed to the port jibe, the boat's compass must read 270° to duplicate the same angle from the direct course to the mark.

Various modifications and changes may be made with respect to the foregoing detailed description without departing from the spirit of the present invention.

I claim:

1. A sailboat racing calculator for use with a compass and a boat speed indicator, said calculator comprising:
   a body;
   a compass dial rotatably supported on said body, the upper surface of said compass dial being provided with indicia corresponding to the degree markings of a compass;
   a bearing window formed on said body through which may be viewed the indicia on said compass dial, the upper surface of said body also being imprinted with a radially extending boat-direction arrow adjacent said window;
   a boat speed arm rotatably supported upon the upper surface of said body on the axis of rotation of said compass dial, said boat speed arm being formed with a radially extending bearing arrow and boat speed indicia; and
   a speed read-out arm vertically slidably carried by said body overlying said boat speed arm and formed with a horizontally extending guideline that intersects the boat speed indicia on said boat speed arm, with the arrow of said body and the arrow of said boat speed arm cooperating with the compass degree indicia of said compass dial and the guideline of said speed read-out arm cooperating with the boat speed indicia on the said boat speed arm to provide information relative to obtaining the optimum combination of compass heading and boat speed by said sailboat.

2. A sailboat racing calculator as set forth in claim 1 wherein said compass dial and said body are formed of an opaque material and said boat speed arm and speed read-out arm are formed of transparent material.

3. A sailboat racing calculator as set forth in claim 1 wherein said body comprises a reference plate that is folded over a backing plate, with said bearing window and said boat heading arrow being formed in said reference plate, said compass dial being supported between said plates and said boat speed arm and said speed read-out arms overlying said reference plate.

4. A sailboat racing calculator as set forth in claim 2 wherein said body comprises a reference plate that is folded over a backing plate, with said bearing window and said boat heading arrow being formed in said reference plate, said compass dial being supported between said plates and said boat speed arm and said speed read-out arm overlying said reference plate.

5. A sailboat racing calculator as set forth in claim 3 wherein said speed read-out arm is folded over at one side to define a flap slidably disposed between said plates, said reference plate is formed with a rectangular aperture and a slider is formed on the underside of said speed read-out arm, with said slider being moveably disposed within said aperture.

6. A sailboat racing calculator as set forth in claim 5 wherein said compass dial and said body are formed of an opaque material and said boat speed arm and speed read-out arm are formed of transparent material.

* * * * *